United States Patent [19]
Faircloth et al.

[11] Patent Number: 5,211,237
[45] Date of Patent: May 18, 1993

[54] PRECIPITATION OF SCALE INHIBITORS

[75] Inventors: Robert J. Faircloth; Jimmie B. Lawson, both of Houston, Tex.

[73] Assignee: Shell Oil Company, Houston, Tex.

[21] Appl. No.: 829,185

[22] Filed: Jan. 31, 1992

[51] Int. Cl.$^5$ .......................... E21B 43/12; E21B 43/22
[52] U.S. Cl. ...................................... 166/279; 166/300; 252/8.552; 252/8.553
[58] Field of Search ............... 166/279, 300, 307, 310, 166/371; 252/8.552, 8.553

[56] References Cited

U.S. PATENT DOCUMENTS

| | | | |
|---|---|---|---|
| 3,483,925 | 12/1969 | Slyker | 166/279 |
| 3,633,672 | 1/1972 | Smith et al. | 166/279 |
| 3,654,993 | 4/1972 | Smith et al. | 166/279 |
| 3,704,750 | 12/1972 | Miles et al. | 166/279 |
| 4,357,248 | 11/1982 | Berkshire et al. | 252/8.552 |
| 4,393,938 | 7/1983 | Lawson et al. | 166/279 |
| 4,860,829 | 8/1989 | Carlberg et al. | 166/279 |
| 4,947,934 | 8/1990 | Hen | 166/279 |
| 5,002,126 | 3/1991 | Carlberg et al. | 166/279 |
| 5,141,655 | 8/1992 | Hen | 166/279 X |

FOREIGN PATENT DOCUMENTS

0459171A1 12/1991 European Pat. Off. .

*Primary Examiner*—George A. Suchfield
*Attorney, Agent, or Firm*—Del S. Christensen

[57] ABSTRACT

Scale inhibitors are precipitated in a formation by injection in an acidic solution comprising a base generating component. The inhibitor is preferably a calcium salt of an organic phosphonate.

10 Claims, 1 Drawing Sheet

5,211,237

PRECIPITATION OF SCALE INHIBITORS

FIELD OF THE INVENTION

This invention relates to wellbore and near wellbore formation scale inhibitors.

BACKGROUND OF THE INVENTION

Slightly soluble inorganic salts, for example calcium carbonate, calcium sulfate, and barium sulfate, often precipitate from waters produced along with oil and gas. Such precipitation occurs because conditions that affect solubility, for example temperature and pressure, change, or because incompatible waters mix in, or near, producing well bores. Precipitates of slightly soluble salts are often called scale. Scale build up often occurs within the near wellbore formation and the wellbore equipment. Scale build-up within the formation decreases permeability and impairs well productivity. Scale build up within wellbore equipment shortens equipment useful life and can plug production tubing.

To minimize scaling, scale inhibitors can be placed within the formation by "squeeze" methods. Squeezing involves injecting the inhibitor and, usually, overflushing the treated zone with water or brine. The well is then placed back into production. Inhibitor in the produced waters protects the wellbore and downhole equipment from scale build-up.

Squeezing inhibitor into the formation is a convenient way to apply an inhibitor. Continuous injection is not required, and the formation in the vicinity of the wellbore is protected. Most common scale inhibitors are effective in concentrations greater than about 1 to 100 parts per million. In a normal squeeze placement, it is difficult to control the concentration of inhibitor returning in produced brines. The inhibitors tend to be produced quickly, with concentrations quickly tailing off to ineffective amounts. This results in frequent shutdowns of production for squeezing operations, and also in excessive chemical costs.

Various attempts to control and delay inhibitor production have been only partially successful. For example, U.S. Pat. No. 3,483,925 discloses a method to provide a more gradual return of inhibitor by injection of the inhibitor with polymer-thickened slugs of solution. Injection of such thickened solutions would inhibit production of all fluids from the wellbore, and is therefore not a desirable method to provide a more gradual return of the inhibitor when production from the wellbore is desired.

U.S. Pat. Nos. 3,633,672 and 3,704,750 discloses inhibitors which are only slightly soluble in neutral or basic solutions and soluble in acidic solutions. These inhibitors are squeezed into the formation in an acidic solution, and then dilution with formation brine and reaction with reservoir rock raises the solution pH and causes precipitation of the inhibitor. The inhibitor is then produced gradually due to a slight solubility in the brine. This method solves many of the problems with squeeze placement of scale inhibitors, but due to plug flow into the formation and then back with production, much of the inhibitor is not precipitated into the formation within a reasonable amount of time. Further, placement of the precipitate is poorly controlled and not predictable.

U.S. Pat. No. 4,357,248 discloses an improvement to processes such as those disclosed in U.S. Pat. Nos. 3,633,672 and 3,704,750. Patent '248 discloses injection of a scale inhibitor in a form which is soluble in a high pH aqueous solution and insoluble in neutral or low pH solutions. The solution further comprises a compound that hydrolyzes to form acidic compounds at a rate which causes the inhibitor to precipitate in the formation without the need for mixing wit formation brines or reaction with formation rocks. This method, in spite of its advantages, has not been widely practiced because of difficulty in handling the useful pH lowering materials.

It is therefore an object of the present invention to provide a method to inhibit scale formation using a squeeze method wherein the inhibitor is injected as an aqueous solution from which the inhibitor precipitates. It is a further object to provide such a method which does not require the use of chemicals which are difficult to handle safely.

SUMMARY OF THE INVENTION

These and other objects are accomplished by a process to emplace a scale inhibitor within a brine containing subterranean formation in the vicinity of a producing wellbore comprising:

providing an acidic aqueous solution comprising a dissolved scale inhibitor and a metal cation combination which is soluble in the formation brine and a precursor which is capable of reacting within the formation to become a basic component;

injecting the acidic aqueous solution into the formation through the wellbore;

producing formation fluids from the wellbore after the precursor has generated an amount of basic material sufficient to cause an amount of the scale inhibitor and metal cation to precipitate within the formation that is effective to provide scale inhibition.

The precipitated metal salt of scale inhibitor dissolves to provide a concentration of inhibitor that effectively delays scale formation, but is not wastefully high.

A scale inhibitor is chosen that is sufficiently soluble in formation brine to provide scale inhibition within the formation and wellbore. The scale inhibitor is precipitated in the formation in an amount which will provide scale inhibition within the formation for an extended time period.

Preferred precursors include common and easily handled materials such as urea(carbamide), acetamide, and dimethyl formamide. Preferred inhibitors include nitrogen containing phosphonate scale inhibiting compounds such as nitrilotri(methylene phosphonic acid), and diethylenetriaminepenta(methylene phosphonic acid).

DETAILED DESCRIPTION OF THE INVENTION

Precursors of the present invention include, but are not limited to amides.

Urea, for example, hydrolyses to form an ammonium carbonate-bicarbonate-carbon dioxide buffer system according to the following reactions.

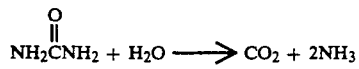

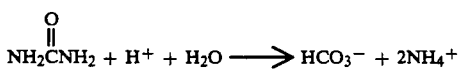

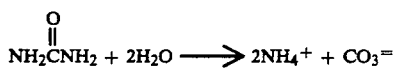

Solutions buffered with hydrolyzed urea typically have pH's of about 7 to 8.

Acetamide hydrolyses to form ammonium acetate according to the following reaction.

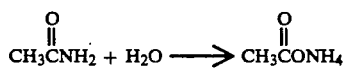

Solutions buffered with hydrolyzed acetamide typically have pH's of about 4 and 5.

Dimethyl formamide hydrolyzes according to the following reaction.

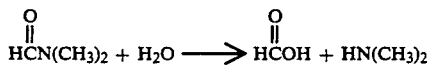

The hydrolysis rate of these precursors is temperature dependent. The temperature of the formation and the time delay desired before deposition of the inhibitor will be considered when selecting the precursor. The pH at which the hydrolysis products buffer solution with strong acids is preferably selected so as to provide a solution with a low solubility of the metal salt of the inhibitor. This minimizes the amount of inhibitor which is utilized in the initial acidic solution and not deposited within the formation.

The amount of precursor will depend upon the amount of acid utilized to lower the pH of the aqueous solution, the time desired for changing the pH, and the downhole conditions. Typically, between about 1 and about 15 moles of precursor will be required for each mole of acid used to lower the pH of the aqueous solution. This will generally be about a 0.1 to a 1.5 molar concentration of precursor.

Mixtures of precursors can be utilized to arrive at preferred pH's after hydrolysis and hydrolysis times.

Inhibitors which are useful include, but are not limited to, anionic scale inhibitors such as polycarboxylates and orqanophosphorus type scale inhibitors. Preferred solubility characteristics can be achieved by use of multivalent metal salts of these inhibitors. The salts of these inhibitors typically have minimum solubilities in weakly acidic pH ranges. Thus, although they are soluble in high pH solutions, as taught in U.S. Pat. No. 4,357,248, they are even more soluble in very acidic solutions. Typically, at pH's below about 2, solubilities of metal salts of these inhibitors are sufficiently high.

Preferred anionic inhibitors include phosphate and phosphonate scale inhibitors. Particularly preferred inhibitors include nitrogen-containing phosphonate scale inhibiting compounds such as nitrilotri(methylene phosphonic acid) and diethylenetriaminepenta(methylene phosphonic acid). These inhibitors are available from Monsanto Chemical Company under the trade names DEQUEST ®2000 and DEQUEST ®2060. Other suitable inhibitors include DEQUEST ®2010 and 2054, also available from Monsanto Chemical Company.

The precursor is preferably added to the acidic aqueous solution just prior to injection into the formation. This minimizes hydrolysis prior to injection.

Figure 1:
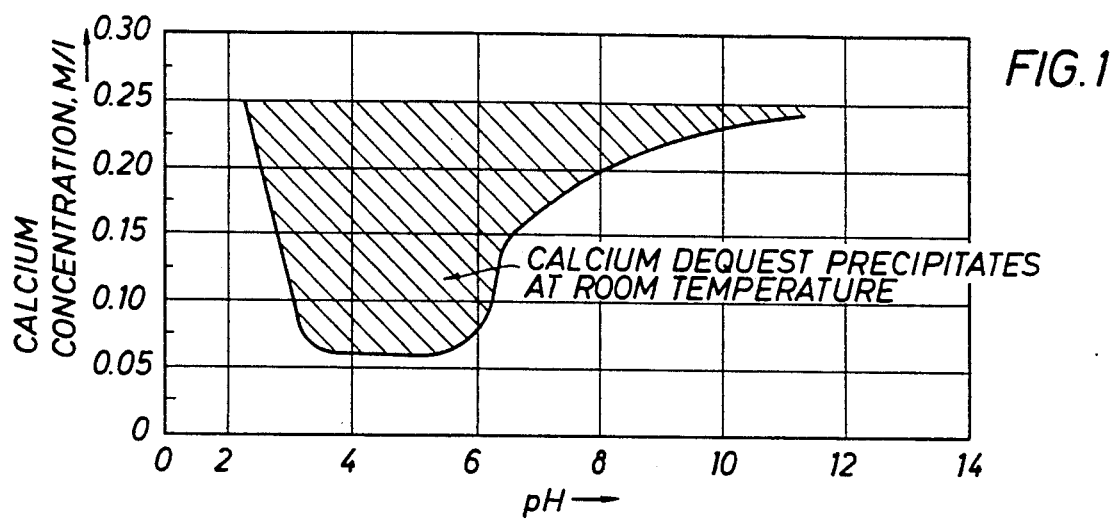
FIG. 1 is a plot showing combination of calcium ion and pH that results in precipitation of a scale inhibitor.

The pH-solubility relationship for a particular cation-inhibitor combination depends on the mole ratio of cations to the inhibitor-anions. The solubility of the calcium salt of DEQUEST ®2060 in a solution containing 0.05 moles per liter inhibitor is shown in FIG. 1. If a solution having a pH outside of the shaded region of FIG. 1, and the pH is then adjusted to within the shaded region by, for example, hydrolysis of a base-producing precursor, the calcium salt of the inhibitor will precipitate. An initial acidic solution of the present invention would be represented by a point such as 1. As the base producing precursor hydrolyzes, the pH of the solution increases to a point such as point 2. At point 2, a considerable amount of the dissolved inhibitor will precipitate as a calcium salt. The solution will be saturated with inhibitor at a calcium concentration indicated by the edge of the shaded region, 3. As production is resumed from the wellbore, the pH of the solution will become that of the formation brine. Typically, formation brines are slightly acidic but highly buffered due to the presence of an abundance of ionic species. The formation brine will dissolve small quantities of the calcium-inhibitor salt thus providing scale inhibition to the near wellbore region of the formation and to the downhole equipment.

It should be noted from FIG. 1 that a highly acidic solution will maintain a greater amount of inhibitor in solution than the basic solutions used in the prior art. The initial solutions can contain higher concentrations of inhibitors. Precipitation of a greater proportion of the inhibitor is therefore possible when the initial solutions are acidic and neutralized by basic products of hydrolysis than when the initial solution has a high pH and is neutralized by acidic products of hydrolysis.

The acidic solutions of the present invention are preferably pushed into formations by overflushing. The overflush fluids may be formation brines, or any liquids compatible with the formation and compatible with the acidic solutions being flushed into the formations. The overflush, or at least an initial portion of the overflush, may advantageously comprise additional quantities of the precursor which forms basic material upon hydrolysis. This will ensure an increase of pH in the acidic solution which mixes with the interface between the acidic solution and the overflush liquids.

After squeezing the acidic solution into the formation, and overflushing with formation brine, injection may be discontinued for a time period sufficient for hydrolysis of an amount of the precursors into basic components effective to raise the pH of the solution and cause precipitation of the metal salt of the inhibitor. During this delay, fluids would neither be produced nor injected. But the precipitation of the metal salt of the inhibitor does not require a complete cessation of injection. Injection of overflush may continue through a portion of the time period for the hydrolysis of the precursors. Precipitation of the metal salt of the inhibitor will occur as the overflush continues to push the acidic solution into the formation. Likewise, production from the wellbore may commence prior to complete precipitation of the metal salt of the inhibitor. For example, when an overflush is used, a volume about equal to the overflush may be produced prior to complete precipitation of the metal salt of the inhibitor without loss of a significant amount of precursor or inhibitor from the formation.

EXAMPLE

Figure 2A:
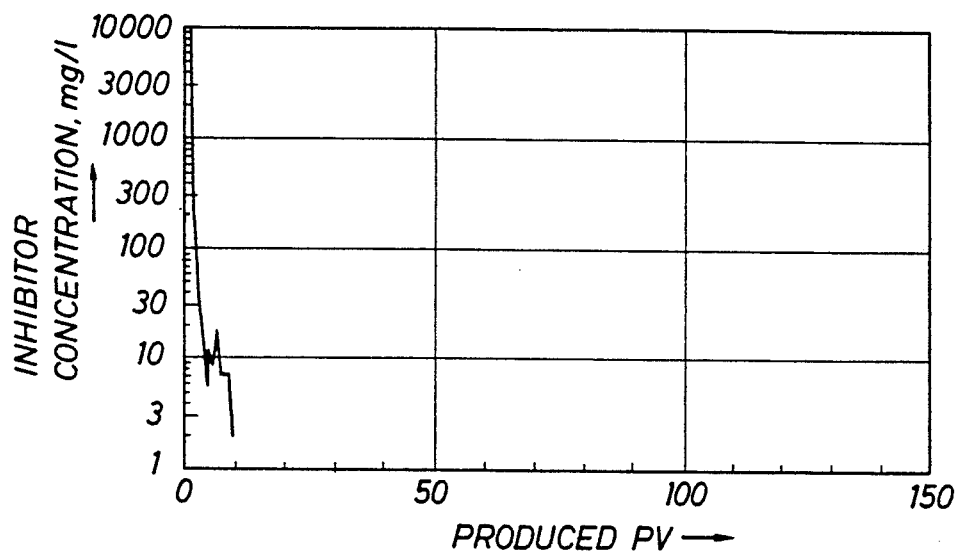
FIGS. 2a and 2b are plots of inhibitor concentration in brine produced from a core in which inhibitor had been placed without a base producing precursor, and according to the present invention, respectively.
Figure 2B:
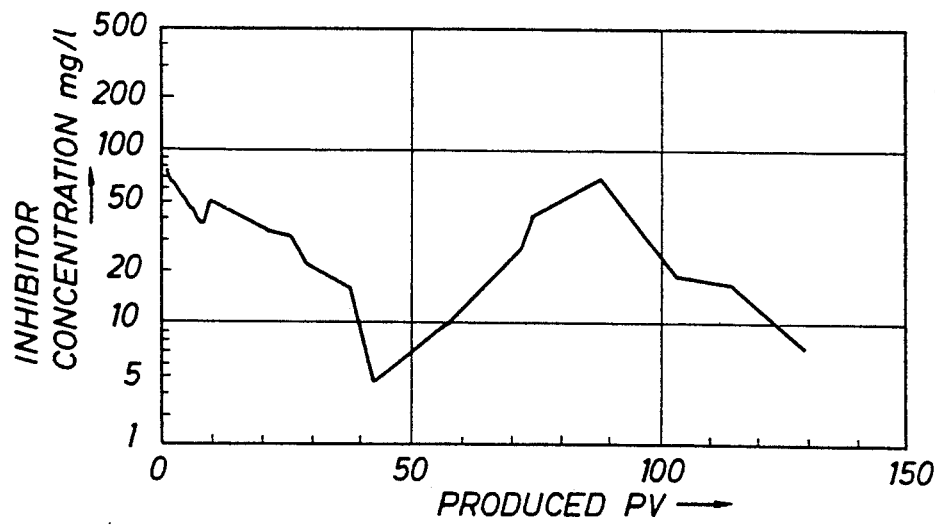

FIGS. 2a and 2b are plots of the concentration of Dequest ®2060, a scale inhibitor commercially available from Monsanto Chemical Company in brine effluent from a core. The concentration is plotted as a function or pore volumes of brine passed through the core. The core was one inch in diameter and inches long and was packed with fine grained sand. At first the core was filled with an aqueous solution of 1% wt. Dequest ®2060, 5% wt sodium chloride and 0.5% wt calcium as calcium chloride. The solution was then displaced with an aqueous solution containing 5% wt sodium chloride and 0.5% wt calcium as calcium chloride. FIG. 2a is a plot of the concentration of Dequest in the core effluent. It can be seen from FIG. 2a that essentially all of the Dequest was contained in the first pore volume of core effluent.

As an example of the present invention, the core was then filled with an aqueous solution containing 1% wt Dequest ®2060, 5% wt sodium chloride, 0.5% wt calcium as calcium chloride, and a concentration of 0.5 molar of urea and 0.036 molar of HCl. The solution was left in the pack for about 16 hours at 160° F., and then displaced with an aqueous solution of 5% wt sodium chloride and 0.5% wt calcium as calcium chloride. The concentration of Dequest in the effluent from the core is plotted as a function of pore volumes of effluent in FIG. 2b. From FIG. 2b it can be seen that useful amounts of Dequest were being produced after about 130 pore volumes of effluent. From a mass balance of the Dequest placed in the core it can be seen that after about 130 pore colume, about 65 percent of the Dequest remained in the core, indicating that a useful amount of inhibitor would be produced for a considerable time.

The foregoing description of the invention is explanatory of the invention and various changes in details of the described invention may be made within the scope of the following claims.

We claim:

1. A process to emplace a scale inhibitor within a brine containing subterranean formation in the vicinity of a producing wellbore comprising:
    providing an acidic solution comprising a dissolved scale inhibitor and a metal cation which combination is slightly soluble in the formation brine and a precursor selected from the group consisting of acetamide and dimethyl formamide, wherein the precursor is capable of reacting within the formation to become a basic component;
    injecting the acidic aqueous solution into the formation through the wellbore; and
    producing formation fluids from the wellbore after the precursor has generated an amount of basic material sufficient to cause an amount of the scale inhibitor and metal cation to precipitate within the formation that is effective to provide scale inhibition.

2. The process of claim 1 wherein the inhibitor comprises nitrilotri(methylene phosphonic acid).

3. The process of claim 1 wherein the precursor is acetamide.

4. The process of claim 1 wherein the precursor is dimethyl formamide.

5. The process of claim 1 wherein the injection of the acidic aqueous solution into the formation is followed by injection of an overflush fluid into the formation.

6. The process of claim 5 wherein the injection of the overflush fluid is following by a period when fluids are neither injected nor produced for the wellbore.

7. The process of claim 1 wherein the inhibitor comprises diethylenetriaminepenta(methylene phosphonic acid).

8. The process of claim 1 wherein the inhibitor comprises a nitrogen containing phosphonate.

9. The process of claim 10 wherein the precursor comprises acetamide.

10. The process of claim 9 wherein the metal cation is calcium.

* * * * *